(12) United States Patent
Erhard et al.

(10) Patent No.: US 7,032,842 B2
(45) Date of Patent: Apr. 25, 2006

(54) SPRAY ELEMENT FOR A SPRAY HEAD

(75) Inventors: Norbert Erhard, Lorch (DE); Hubert Pschenitschni, Winterbach (DE)

(73) Assignee: Oskar Frech GmbH & Co. KG, Schorndorf (DE)

( * ) Notice: Subject to any disclaimer, the term of this patent is extended or adjusted under 35 U.S.C. 154(b) by 0 days.

(21) Appl. No.: 10/825,371

(22) Filed: Apr. 16, 2004

(65) Prior Publication Data

US 2004/0217212 A1 Nov. 4, 2004

(30) Foreign Application Priority Data

Apr. 19, 2003 (EP) .................................. 03009081

(51) Int. Cl.
*B05B 7/12* (2006.01)

(52) U.S. Cl. ........................ 239/412; 239/571; 239/572; 239/583

(58) Field of Classification Search .................. 251/62, 251/63.4, 63.5; 239/571, 572, 583, 412, 239/417.5

See application file for complete search history.

(56) References Cited

U.S. PATENT DOCUMENTS

| | | | | |
|---|---|---|---|---|
| 1,986,206 A | | 1/1935 | Kennedy et al. | |
| 2,543,590 A | * | 2/1951 | Swank | 137/614.06 |
| 3,025,669 A | * | 3/1962 | Fischoff | 60/39.27 |
| 3,987,810 A | | 10/1976 | Bjoklund | |
| 4,067,348 A | * | 1/1978 | Davis | 137/87.01 |
| 4,166,084 A | * | 8/1979 | Shea | 261/69.2 |
| 4,365,754 A | | 12/1982 | Levine et al. | |

FOREIGN PATENT DOCUMENTS

DE 32 38 201 A1 6/1984

\* cited by examiner

*Primary Examiner*—Christopher Kim
(74) *Attorney, Agent, or Firm*—Crowell & Moring LLP

(57) ABSTRACT

In a spray element for a spray head for spraying the molds of pressure casting machines, a control piston for the release of the parting agent supply is disposed beside the spray nozzle and a connecting passage opens in a chamber of the housing in which one end of the control piston is sealingly guided, while its second end lies with a sealing ring before a chamber fed with parting agent. In the case of the application of control air the sealing ring is shifted out of its cylindrical section 26 into the chamber, so that the feed of parting agent to the spray nozzle is released. If the control air is shut off, then the sealing ring closes the delivery of the parting agent, and the second, larger end of the control piston exercises upon its return movement a reverse suction effect on the connecting passage. Any after-dripping of parting agent is securely prevented.

5 Claims, 2 Drawing Sheets

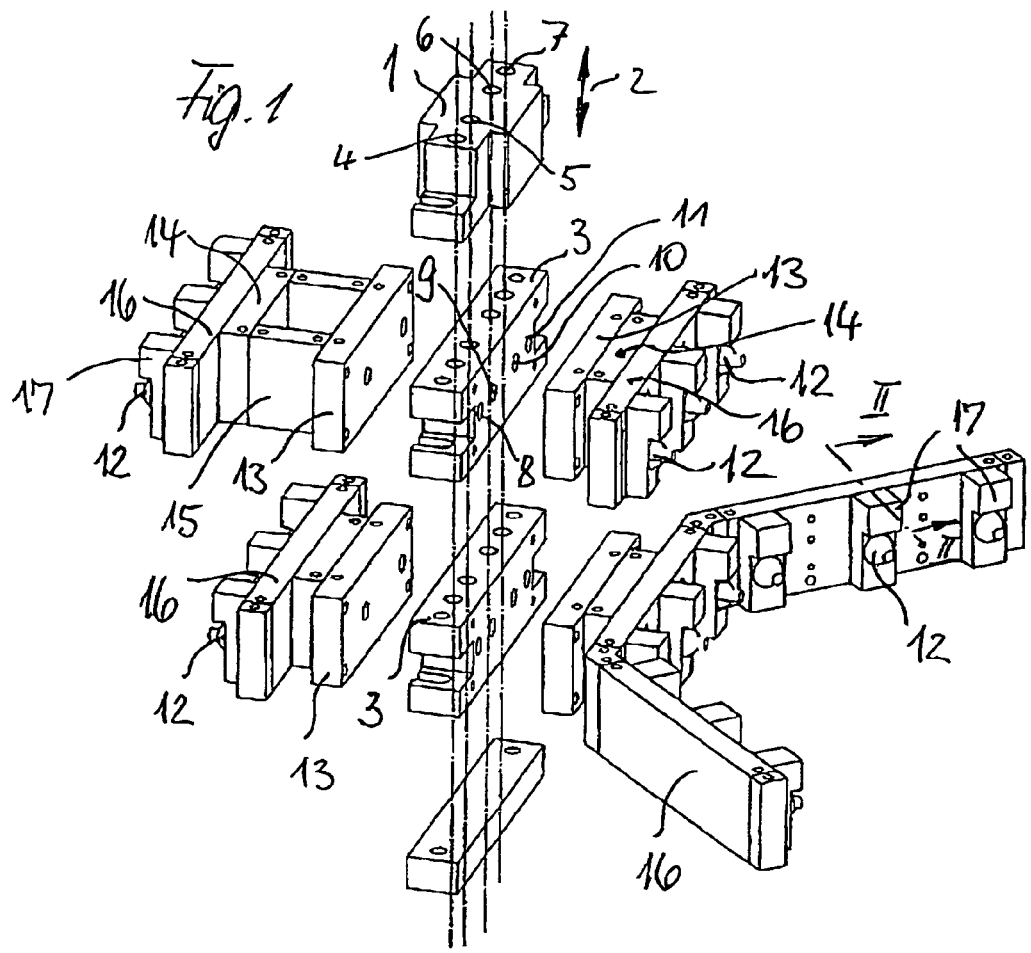

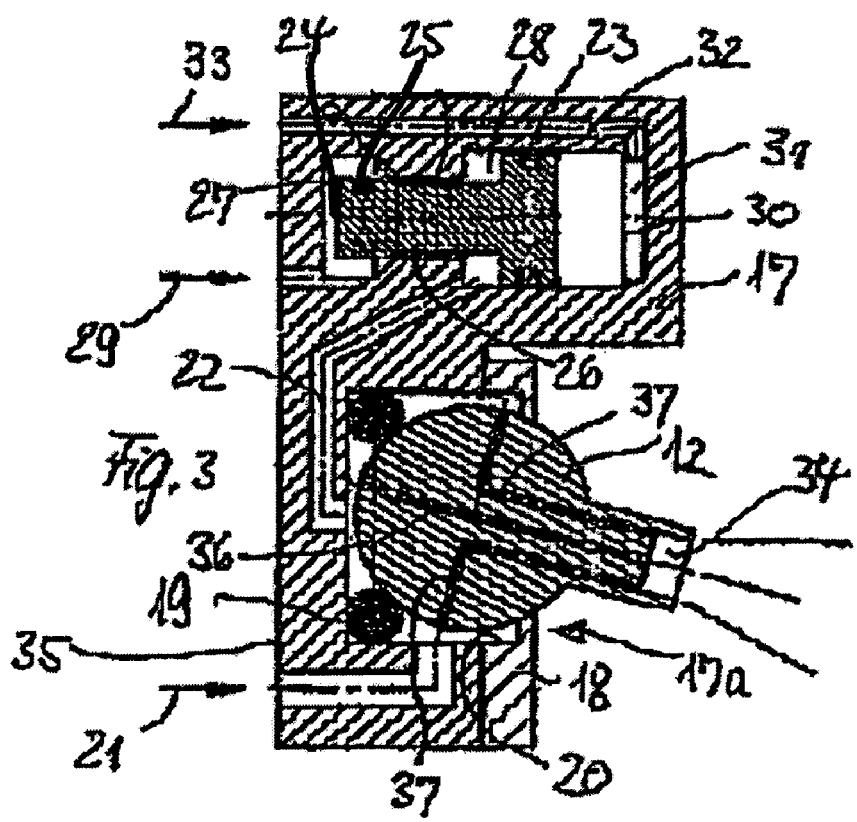

SPRAY ELEMENT FOR A SPRAY HEAD

This application claims the priority of European Patent Document No. 03009081.5, filed Apr. 19, 2003, the disclosure of which is expressly incorporated by reference herein.

BACKGROUND AND SUMMARY OF THE INVENTION

The invention relates to a spray element for a spray head, especially for spraying the molds of pressure casting machines. The spray element has a spray nozzle which can be fed with control air and the medium to be sprayed, and a valve is provided with a control piston operated by control air.

DE 32 38 201 A1 discloses a spray element, in which a spring-loaded control piston is forced by the spring force with its one end, on which a gasket sits, against a valve seat in front of which a connecting bore opens to a parting agent connection. Therefore, if the piston is moved against the spring force by controlling air, the valve seat opens and the parting agent that is to be sprayed can issue through a center nozzle opening where it can be sprayed by means of controlling air jets which surround the jet of the parting agent.

A certain disadvantage of such spray elements include that, when the parting agent feed to the nozzle orifice is shut off, i.e., when the gasket of the control piston is driven by control air against its seat, it can lead to unwanted dripping of any parting agent still present around the discharge opening.

An object of the invention is to improve a spray element of the kind referred to above such that any dripping of the medium being sprayed is prevented by comparatively simple means.

To achieve the object, in a spray element of the kind referred to above, the control piston is arranged next to the spray nozzle with both ends of the control piston in the cylindrical sections of a housing. The first end has a smaller diameter than the second end and is guided by a sealing ring in a cylindrical section before a first chamber fed with the medium to be sprayed. The second end is guided in a second cylindrical chamber into which a communicating bore leads into the spray valve and which has on the side facing away from the first end of the control piston a connection for control air. The distance between the two ends of the control piston is chosen such that the sealing ring when in the starting position lies sealingly in the cylindrical section, and when control air is applied to the second end it enters the first chamber.

By this arrangement, therefore, when control air is applied to the control piston, the feeding of the medium to the spray nozzle is released, namely through the second cylindrical chamber, so that then this medium can be sprayed with compressed air. If, however, the control air is not applied, then the control piston is moved by the pressure of the medium being sprayed back to its starting position in which the feeding of the medium being sprayed is stopped. Simultaneously, however, the backward movement of the second end of the control piston increases the volume in the second cylindrical chamber and thus a certain vacuum is produced, with the result that the medium held in the bore connecting to the spray nozzle is moved back, i.e., sucked back so that any after-drip is prevented.

In developing the invention, the housing of the control piston can be provided with an extension to receive the spray nozzle, this extension can also be a one-piece component of the housing.

In a further development of the invention, all connections for control air, the medium to be sprayed, and compressed air can be arranged on the side of the housing that faces away from the discharge opening of the spray nozzle. Thus an easily assembled modular component is achieved which can be attached in a relatively simple manner to corresponding spray arms provided with passages carrying the individual media.

Other objects, advantages and novel features of the present invention will become apparent from the following detailed description of the invention when considered in conjunction with the accompanying drawings.

BRIEF DESCRIPTION OF THE DRAWINGS

FIG. 1 is an exploded view of a spray head in which spraying elements according to the invention are inserted.

FIG. 2 is an enlarged view of a section through a spray element of FIG. 1 in a plane which is indicated by the section line II—II in FIG. 1.

FIG. 3 is the same view as shown in FIG. 2, wherein the sealing ring enters the first chamber.

DETAILED DESCRIPTION OF THE DRAWINGS

FIG. 1 shows a spray head, in which a spray element of the invention can be used. A part 1 of an arm which can be guided for movement in the direction of the arrows 2 is provided on its bottom with a plurality of distributor blocks 3 arranged in line with one another, which are all of identical shape and arranged one under the other in the direction of the movement 2. The distributor blocks 3 are arranged tightly one on the other and tightly against the connection end of the arm 1.

The arm 1 can be provided in known manner with a controllable drive, and has in its interior the schematically indicated through-passages 4, 5, 6 and 7, each serving for the delivery of parting agent, control air and compressed air. These through-passages 4 to 7 continue downward through each distributor block, and a supply passage branches transversely from each of the passages. The supply passages lead to points 8, 9, 10 and 11 on the sides of the distributor blocks 3. From there again the connection to spray nozzles 12 is provided through connecting plates 13 and flange blocks 14, in some cases also with the interposition of spacers 15. In this manner it becomes possible to arrange spray nozzles 12 in various ways in a horizontal plane of one of the distributor blocks 3 in order to adapt the spray block to the internal shape of the moving mold halves and stationary mold halves of a pressure casting machine. It is of course necessary after each casting operation to spray these mold halves with parting agent or also to blow them out with compressed air.

A spray nozzle 12 is, as shown in FIG. 2, arranged in a projection 17a of a housing 17. In the embodiment the spray nozzle 12 is provided with a spherical coupling which is urged against a gasket 19 inside a chamber 20 which is supplied with compressed air in the direction of the arrow 21 on the side where the gasket 19 is situated. On the bottom on which the gasket 19 also lies, the chamber 20 is connected with a connecting passage 22 which leads to a housing part inside the housing 17, in which a control piston 23 is disposed. In this portion of the housing 17 a first end 24 of the control piston 23 is guided with a piston ring 25 in a cylindrical section 26 which separates a first chamber 27 from a second chamber 28.

The first chamber 27 is supplied with a parting agent in the direction of the arrow 29. The pressure of the parting agent is applied to the face of the first end 24 of the control piston 23 and holds the control piston 23 in the position shown. At this position, the control piston 23 abuts at its second end 30, which has a greater diameter than the first end 24, against an abutment on the right of the chamber 28. Between the free face of the second piston-like end 30 and the housing 17 there remains a space 31 which can be fed with control air through a bore 32 in the direction of the arrow 33 whenever a corresponding impulse is present for supplying control air.

It can be seen that all compressed air connections (arrow 21) for parting agent (arrow 29) and for control air (arrow 33) are provided on the same mounting surface 35 on the side of housing 17 facing away from the discharge opening 34 of the spray nozzle 12. The housing 17 can thus be applied in a simple manner to spray arms 16 in the interior of which the corresponding feed passages run, which in turn are in communication with the passages 4 to 7 in the manner previously described.

The operation of the spray element of FIG. 2 is as follows:

In the illustrated position of the control piston 23 the connection to chamber 27 is closed. The parting agent is therefore under pressure in this chamber. Compressed air can enter the chamber 20 in the direction of arrow 21 and be discharged from the orifice 34 of the spray nozzle 12, for example for blow-drying purposes. It is however also possible in this condition to stop the supply of compressed air from the exterior.

When control air is injected in the direction of arrow 33 into the chamber 31, the control piston 23 is shifted leftward from its position in FIG. 1, while the sealing ring 25 comes out of the cylindrical section 26 and the parting agent can enter under pressure into the chamber 28 and from there can pass through the connecting passage 22 into the space inside of the sealing ring 19, as shown in FIG. 3. The parting agent is therefore carried through the bore 36 in the center of the spray nozzle 12 to its discharge orifice 34 where it is fed by compressed air, which is fed in the direction of the arrow 21, and exits from the bore 36 through passages 37, is atomized, and is discharged in a spray.

If the spraying is to be stopped, the control air 33 is shut off and the control piston 23 moves under the pressure of the parting agent in the chamber 27 back to the position represented in FIG. 2. At this position, the connection between chambers 28 and 27 is shut off and therefore no more parting agent can be fed, but a withdrawing effect is exerted on the parting agent still within the connecting passage 22.

Due to the reverse movement of the control piston to the position shown in FIG. 2, after the sealing ring 25 enters the cylindrical section 26, the volume of chamber 28 is increased, so that the reverse suction effect acts also on bore 36 and the parting agent is securely prevented from undesirably dripping and spraying.

As already mentioned, the system can be used also with the parting agent feed shut off, in order to blow the molds dry, that is, in case compressed air exclusively is blown in the direction of arrow 21, unaccompanied by parting agent.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spray element for a spray head, comprising:
   a casing including a first chamber, a cylindrical section having the share of a cylinder, a second cylindrical chamber, and a connecting bore, wherein the cylindrical section is placed between the first chamber and the second cylindrical chamber, and wherein the first chamber is connected a medium to be sprayed;
   a valve including a control piston having first and second end portions, a rod connecting the first and second end portions, and a sealing ring disposed on the first end portion; and
   a spray nozzle disposed in the casing, which spray nozzle can be fed through the valve with compressed air and with the medium to be sprayed,
   wherein the first end portion of the control piston has a smaller diameter than the second end portion and is guided with the sealing ring in the cylindrical section of the casing,
   wherein the second end portion is guided in the second cylindrical chamber and divides the second cylindrical chamber into a first section, which is connected with the spray nozzle through the connecting bore, and a second section which is connected with control air, and
   wherein the distance between the end portions of the control piston is chosen such that the sealing ring in a starting position of the control piston lies sealingly in the cylindrical section and, upon the application of control air to the second end portion, enters the first chamber so as to allow the medium to be sprayed to flow through the cylindrical section into the second cylindrical chamber.

2. The spray element according to claim 1, wherein the casing has a projection for receiving the spray nozzle.

3. The spray element according to claim 2, wherein the projection is integral with the rest of the casing.

4. The spray element according to claim 1, wherein connections for the control air, the medium to be sprayed and compressed air are disposed on a side of the casing which faces away from a discharge orifice of the spray nozzle.

5. A method for making a spray element for a spray head, comprising:
   placing a cylindrical section of a casing of the spray element between a first chamber and a second cylindrical chamber of the casing of the spray element, wherein the cylindrical section has the shape of a cylinder;
   connecting the first chamber to a medium to be sprayed;
   disposing a spray nozzle in the casing, which spray nozzle can be fed through a valve with compressed air and with the medium to be sprayed, wherein a first end portion of a control piston of the valve has a smaller diameter than a second end portion of the control piston;
   placing the first end portion of the control piston with a sealing ring in the cylindrical section of the casing;

placing the second end portion of the control piston in the second cylindrical chamber, thus dividing the second cylindrical chamber into a first section, which is connected with the spray nozzle through a connecting bore of the casing, and a second section, which is connected with control air; and choosing the distance between the end portions of the control piston such that the sealing ring in a starting position of the control piston lies sealingly in the cylindrical section and, upon the application of control air to the second end portion, enters the first chamber so as to allow the medium to be sprayed to flow through the cylindrical section into the second cylindrical chamber.

* * * * *